(12) United States Patent
Kinouchi et al.

(10) Patent No.: US 6,375,206 B1
(45) Date of Patent: Apr. 23, 2002

(54) STEERING APPARATUS FOR FOUR-WHEELED VEHICLE

(75) Inventors: Sosuke Kinouchi, Kakogawa; Masatoshi Inoue, Himeji, both of (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/542,883

(22) Filed: Apr. 4, 2000

(30) Foreign Application Priority Data

Oct. 13, 1999 (JP) .......................................... 11-290933

(51) Int. Cl.$^7$ ................................................. B62D 7/10
(52) U.S. Cl. ............................ 280/93.509; 280/93.513
(58) Field of Search ........................... 280/771, 93.508, 280/93.509, 93.51, 93.513, 93.514; 74/409, 440

(56) References Cited

U.S. PATENT DOCUMENTS 4,441,735 A * 4/1984 Hutchison et al. .......... 280/771
5,099,714 A * 3/1992 Hutchison et al. .......... 74/422

FOREIGN PATENT DOCUMENTS

| JP | A 56-141872 | 10/1981 |
| JP | 57-204266 | 12/1982 |
| JP | U 61-64545 | 5/1986 |
| JP | 6-8833 | 1/1994 |
| JP | 6-257660 | 9/1994 |
| JP | 7-332439 | 12/1995 |

* cited by examiner

Primary Examiner—Kevin Hurley
(74) Attorney, Agent, or Firm—Oliff & Berridge, PLC

(57) ABSTRACT

A steering apparatus for a four-wheeled vehicle transmits a steering force through a steering shaft, a reduction gear mechanism, a steering lever and right and left tie rods to right and left knuckles. The reduction gear mechanism includes a pinion gear turned by the steering shaft, and steering gear engaged with the pinion gear mounted on a lever shaft. The pinion gear and the steering gear are cut in a taper and both of the gears are press-engaged together in an axial direction by a spring so that no backlash is formed between the pinion gear and the steering gear.

5 Claims, 6 Drawing Sheets

STEERING APPARATUS FOR FOUR-WHEELED VEHICLE

BACKGROUND OF THE INVENTION

1. Field of the Invention

The present invention relates to a steering apparatus for a four-wheeled vehicle. This steering apparatus is used to transmit a steering force applied to a handle, which is connected to a steering shaft, through a reduction gear mechanism, a steering lever and a pair of tie rods to knuckles, which support right and left wheels, respectively.

2. Description of the Related Art

A steering apparatus for a four-wheeled vehicle, particularly, a low-speed utility vehicle is provided with a rack-and-pinion reduction gear mechanism (steering gear mechanism). The rack-and-pinion reduction gear mechanism includes a pinion connected to a steering shaft, and a rack engaged with the pinion and capable of moving to right and left, i.e., in the direction along the width of a vehicle. The opposite ends of the rack are connected to right and left knuckles by tie rods, respectively.

The long rack of the rack-and-pinion reduction gear mechanism is disposed so as to extend and move laterally, and hence the right and left tie rods are inevitably short. In case that such short tie rods are used, the position of the rack with respect to the back-and-forth direction cannot be spaced a long distance apart from the position of the joint of the knuckle and the tie rod. Therefore, the flexibility of the positioning of the rack is strictly restricted.

If the rack is disposed far ahead of the joints of the knuckles and the tie rods with respect to the back-and-forth direction to secure a wide space for driver's feet on a step, the mounting angles of the tie rods become large. As a result, a high steering force is necessary. Thus, the position of the rack along the back-and-forth direction must be in a narrow range to achieve a low steering force by making the mounting angles of the tie rods small. On the other hand, the mounting angles of the tie rods must be large to secure a wide space for driver's feet. As a result, a high steering force is inevitably caused.

Another type of steering apparatus includes a spur gear type reduction gear mechanism with a set of pinion and spur gear instead of rack and pinion. Long tie rods can be used because the spur gear does not need a wide lateral space. Even if the reduction gear mechanism is disposed far ahead of the joints of the knuckles and the tie rods, the mounting angles of the tie rods can be small. As a result, a low steering force can be achieved. This kind of steering apparatus with the spur gear type reduction gear mechanism is disclosed in Japanese Laid-Open Publication No. 292224/1992.

SUMMARY OF THE INVENTION

It is an object of the present invention to provide a steering apparatus with a spur gear type reduction gear mechanism which is capable of eliminating backlash in the reduction gear mechanism by a low parts count and simple constitutions and of giving the driver an improved steering feeling.

According to the present invention, a steering apparatus for a four-wheeled vehicle, comprising: a steering shaft adapted to be rotated by a handle; a reduction gear mechanism including: a pinion gear, a steering gear engaged with the pinion gear, a pinion shaft on which the pinion gear is mounted being operatively connected to the steering shaft, a lever shaft on which the steering gear is mounted, the pinion gear and the steering gear cut to a taper respectively; a steering lever connected to the lever shaft; right and left tie rods operatively connected to the steering lever; right and left knuckles operatively connected to the right and left tie rods respectively; and a spring for pressing one of the gears to axial direction so that both of the gears press-engaged each other.

Preferably, the spring is disposed on one end of said pinion shaft.

Preferably, the spring is disposed on one end of said lever shaft.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
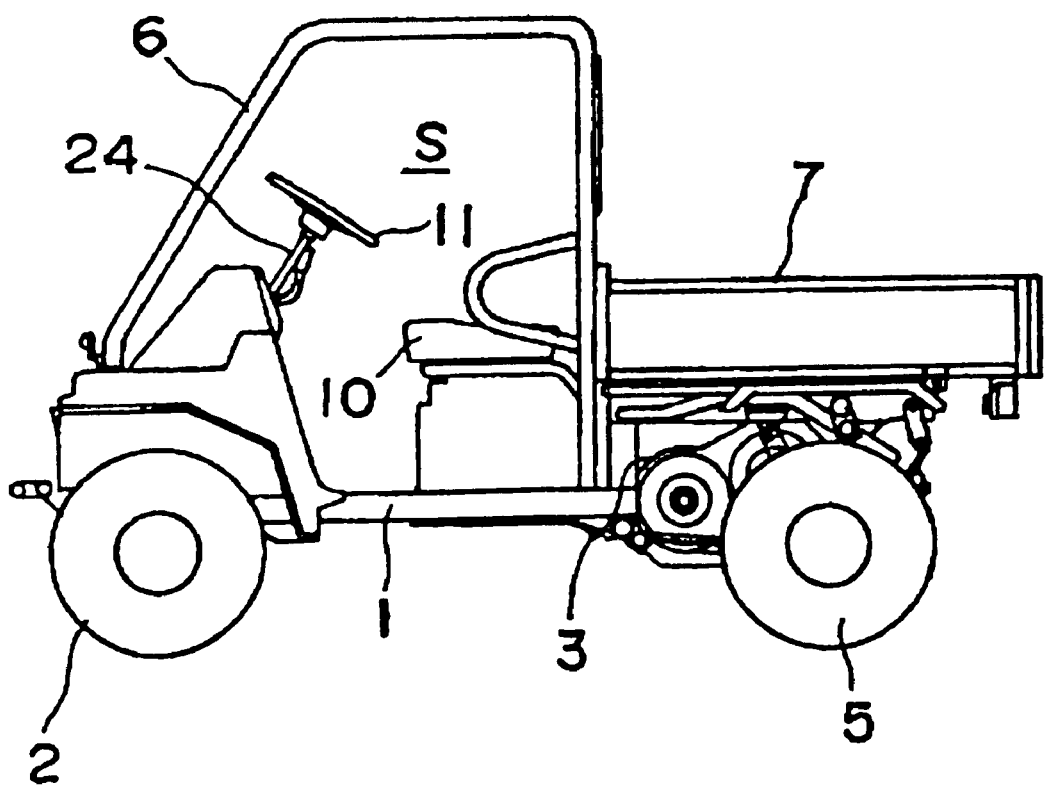
FIG. 1 is a side elevation of four-wheeled vehicle provided with a steering apparatus in a preferred embodiment according to the present invention.

Referring to FIG. 1, there is shown a utility vehicle provided with a steering apparatus in a preferred embodiment according to the present invention. Right and left wheels 2 are supported in a front portion of a main frame 1. The utility vehicle is a rear-engine vehicle with an engine in a rear portion thereof. A transmission and right and left rear wheels 5 serving as driving wheels. A passenger space S is defined by a cabin frame 6 in a front half portion of the vehicle. A baggage deck 7 is disposed in a rear half portion of the vehicle. A seat 10 is installed in a rear region of the passenger space S and a circular handle 11 is disposed in a front region of the passenger space S.

Figure 2:
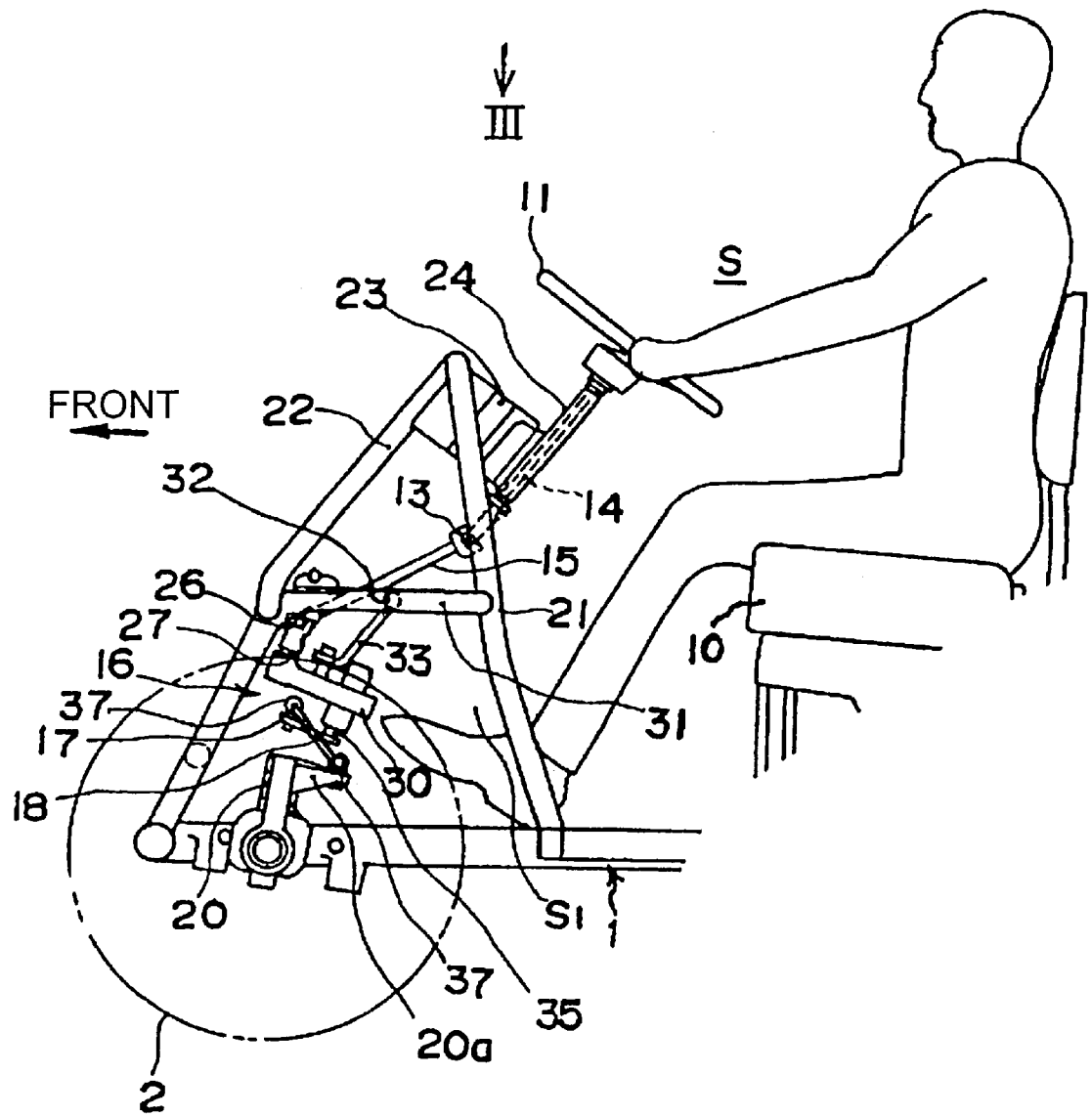
FIG. 2 is a side elevation of an internal structure in a front half of the vehicle shown in FIG. 1.
Figure 3:
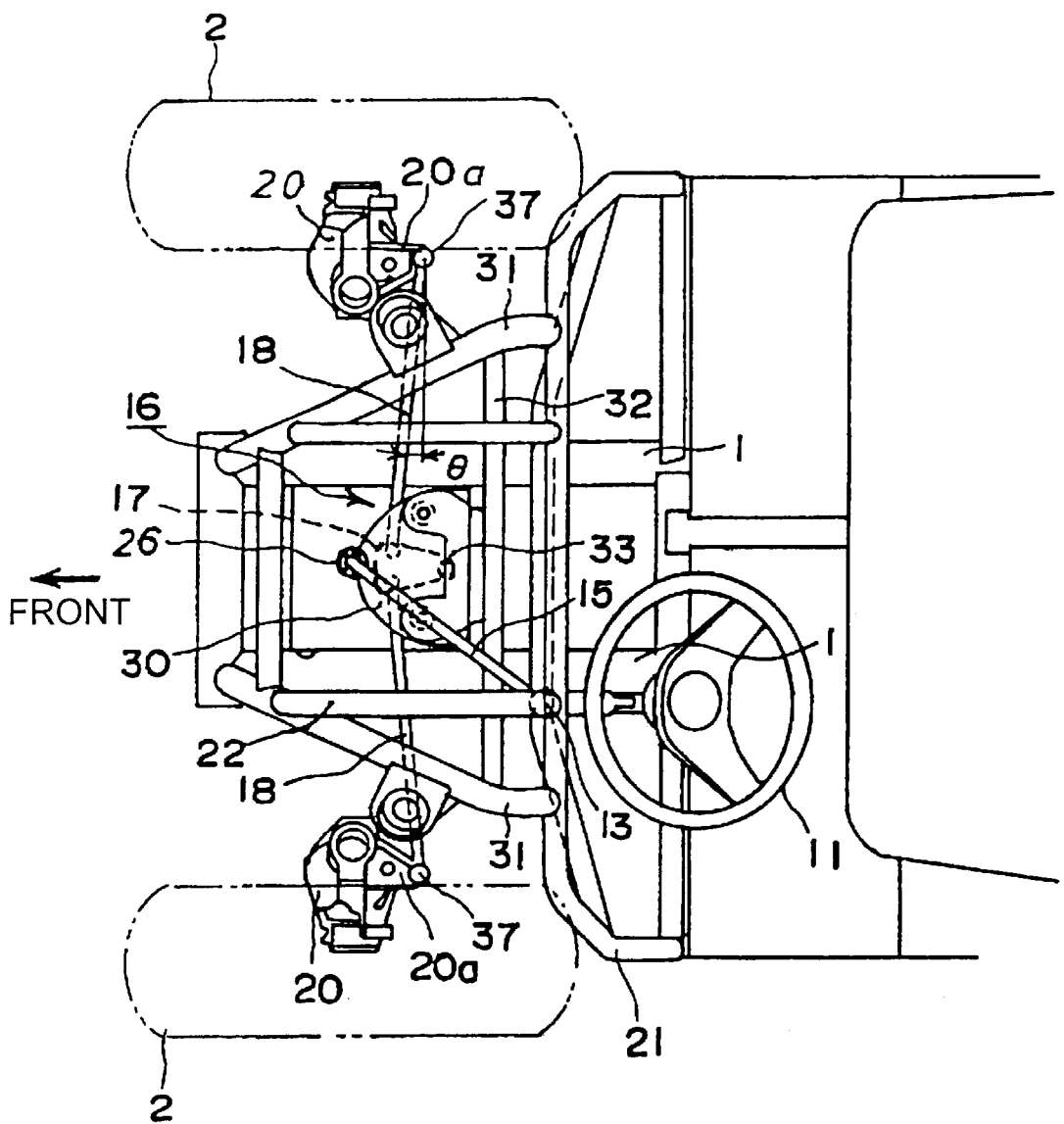
FIG. 3 is a plan view taken along the direction of the arrow III in FIG. 2.

Referring to FIGS. 2 and 3, a steering apparatus is installed in a front region of the passenger space S. The steering apparatus has an upper steering shaft 14, which is extending obliquely downward from the handle 11, a lower steering shaft 15, which is connected to and extending obliquely downward from the lower end of the upper steering shaft 14, a reduction gear mechanism 16, which has a steering lever 17 and is connected to the lower end of the lower steering shaft 15, right and left tie rods 18, which are joined to the steering lever 17 of the reduction gear mechanism 16, and front knuckles 20, which are joined to the free ends of the tie rods 18, respectively.

The steering shafts 14 and 15 are coupled with each other by a universal joint 13 so that they can bend. The upper steering shaft 14 is supported for rotation in a support pipe 24. The support pipe 24 is held by a bracket 23 on a component pipe 22 of a front frame 21. The lower end portion of the lower steering shaft 15 is connected to a pinion shaft 27, which is included in the reduction gear mechanism 16, by a universal joint 26.

The reduction gear mechanism 16 has a gear case 30 which is disposed in a front region of a foot space S1. The position of the gear case 30 along the back-and-forth direction substantially corresponds to the positions of the knuckles 20. The gear case 30 is fixedly held by a bracket 33 which is attached to a cross pipe 32 of a lower frame 31. An output lever shaft 35 projects downward from a rear portion of the gear case 30. A rear end portion of a steering lever 17 is fixedly connected to the lower end portion of the lever shaft 35. The opposite ends of each tie rod 18 are joined by ball joints 37 to the steering ever 17 and the knuckle 20, respectively.

Referring to FIG. 3, the gear case 30 is disposed at a position substantially corresponding to the middle of the width of the vehicle. The tie rods 18 are extending from the steering lever 17 to the knuckle arms 20a of the right and the left knuckles 20, respectively. The mounting angles θ of the tie rods 18 are very small.

Figure 4:
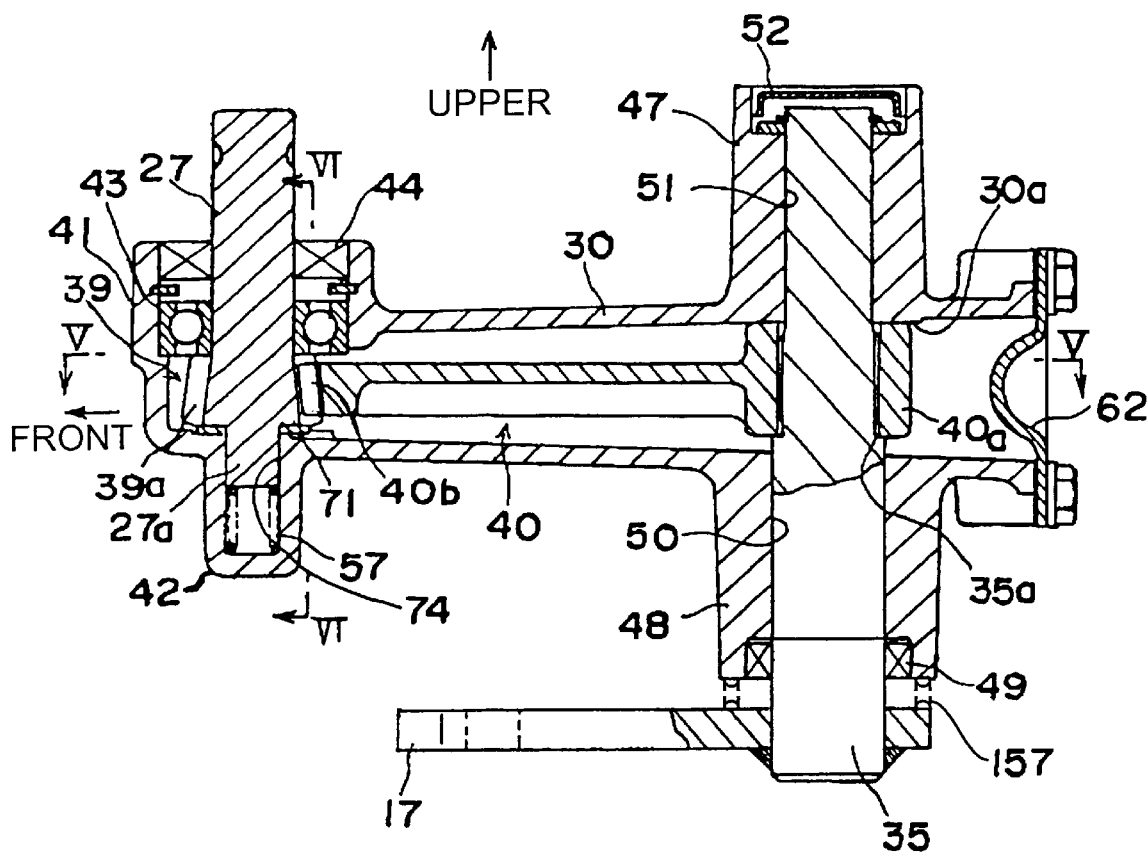
FIG. 4 is a vertical sectional view of a reduction gear mechanism.

Referring to FIG. 4 showing the reduction gear mechanism 16 in a vertical sectional view, the gear case 30 is formed in one piece of die-cast. A pinion gear 39 which is formed integrally with the pinion shaft 27 and a steering gear 40 which is engaged with the pinion gear are housed in the gear case 30. The pinion gear 39 and the steering gear 40 are spur gears having external teeth. The gear case 30 is provided in its front end portion with an upper boss 41 and a bottomed lower boss 42 for supporting the pinion shaft 27. A lower end portion of the pinion shaft 27 is fitted in a bore formed in the lower boss 42, and an upper end portion of the pinion shaft 27 is supported in a ball bearing 43 which is fitted in the upper boss 41. A sealing member 44 is fitted in an upper end portion of the bore of the upper boss 41.

The gear case 30 is provided in its rear end portion with an upper boss 47 and a lower boss 48 for supporting the lever shaft 35. The lever shaft 35 disposed parallel with the pinion gear shaft 27 is supported at the upper and lower portions thereof in a upper bearing bore 51 and a lower bearing bore 50 formed in the upper boss 47 and the lower boss 48 respectively so that the lever shaft 35 can rotate. A sealing member 49 is fitted in a lower end portion of the bore of the lower boss 48. The open upper end of the bearing bore 51 is covered with a cap 52. A hub 40a formed in a rear portion of the steering gear 40 is put on a middle portion of the lever shaft 35 between the bosses 47 and 48 and is press-fitted and interlocked with the lever shaft 35 by splines. The lower end of the hub 40a is supported by an edge 35a. The upper end of the hub 40a is contacted with a sliding surface 30a of the gear case 30 so that they can slide. An open rear end of the gear case is covered with a cover 62 which is detachably attached thereto.

Figure 5:
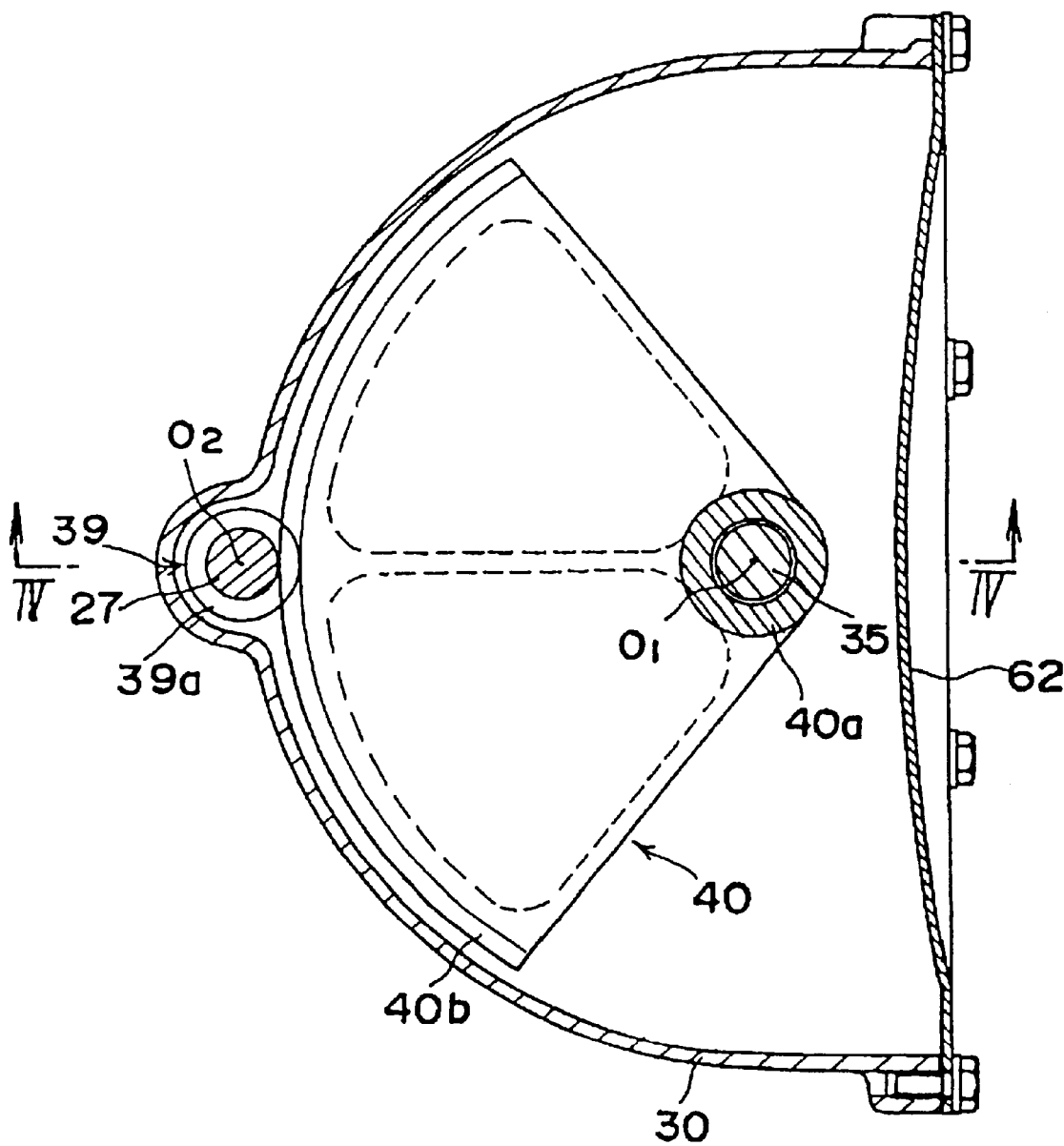
FIG. 5 is a horizontal sectional view taken on line V—V in FIG. 4.

Referring to FIG. 5 showing a horizontal sectional view taken on line V—V in FIG. 4, the steering gear 40 is formed to a sector centering a center $O_1$ of the lever shaft 35.

A mechanism for eliminating backlash between the pinion gear 39 and the steering gear 40 will be described hereinafter. Referring to FIG. 4, though the pinion gear 39 is spur gear, gear teeth portion 39a is cut to a taper gear increased diameter in the downward direction. Specifically, a tip diameter and a root diameter of the gear teeth are formed to a taper at same taper angle, and a tooth depth and tooth thickness are formed to a same dimension along the taper direction.

On the other hand, though the steering gear 40 is also a spur gear, gear teeth portion 40b is cut to a taper gear such that its diameter is increased in the upward direction. As in the case of the pinion gear 39, in the case of the steering gear 40, a tip diameter and a root diameter of the gear teeth are formed to a taper at a same taper angle, and a tooth depth and a tooth thickness are formed to a same dimension along the taper direction.

The lower end of the pinion gear 39 is supported by an inner surface of the gear case 30 though a thrust washer 71. The lower portion of the pinion gear 39, formed slenderer than its upper portion, is supported by a bearing bore 74 of the lower boss 42 directly. The bearing bore 74 has a spring housing hole extending from the lower end of the pinion shaft 27 to downward. A compression coil spring 57 is fitted in the spring housing hole. The compression coil spring is extending between the lower end of the pinion shaft 27 and the bottom end wall of he lower boss 42 so that the pinion shaft 27 is pushed upward in the axial direction. In this arrangement, the gear teeth 39a of the pinion gear 39 and the gear teeth 40b of the steering gear 40 are press-engaged each other.

In operation, the handle 11 is turned in a desired direction to turn the pinion shaft 27 through the steering shafts 14 and 15. The rotating speed of the pinion shaft 27 is reduced to the rotating speed of the lever shaft 35 by the reduction gear mechanism 16. Consequently, the steering lever 17 is turned through a desired angle to the right or to the left, and the knuckles 20 are turned through the tie rods 18 to turn the front wheels 2 through a desired angle.

The pinion shaft 27 is always pushed upward in the axial direction by the compression coil spring 57 as shown in FIG. 4. Therefore, the gear teeth of the pinion gear 39 and the steering gear 40 are press-engaged each other so that backlash between the pinion gear 39 and the steering gear 40 is eliminated.

Figure 6:
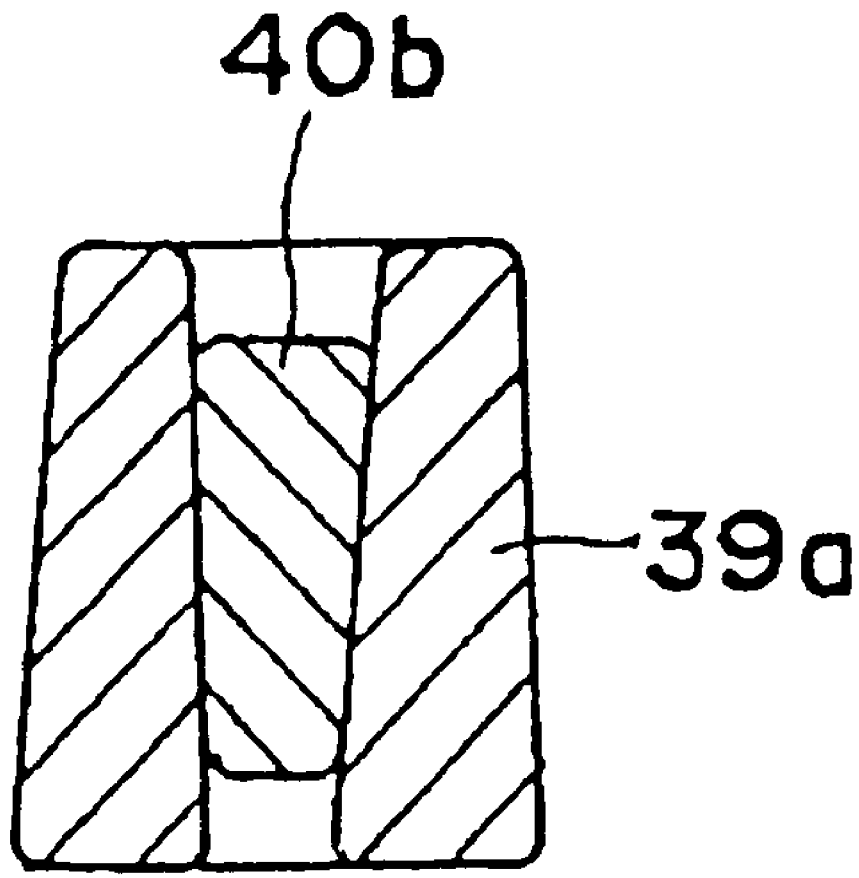
FIG. 6 is a developed sectional view of cross-section shape of the gear taken on line VI—VI in FIG. 4.

FIG. 6 is a developed view of cross-section shape taken on line VI—VI in FIG. 4 which is in parallel with the axis of the shaft 27 where the both of the teeth of the gear 39 and 40 are engaged. As both of the teeth 39a and 40b are formed to a taper, the sectional shape of the teeth 39a and 40b in cross-section VI—VI is shaped as taper off wedges opposed to each other as shown in FIG. 6. Therefore, the backlash is eliminated by pushing the pinion gear 27 to the axial direction so that the both of the gear teeth 39a and 40b are press-engaged each other.

Other embodiments of present invention will be described hereinafter. Although the compression coil spring 57 in FIG. 4 is disposed under the pinion gear shaft 27 so that the pinion gear shaft 27 is pressed upward, in the case where both of the gears 39 and 40 are cut in a taper in the reverse direction respectively, the compression coil spring 57 is disposed on the pinion gear shaft 27 so that the pinion gear shaft 27 is pressed downward.

A spring 157 for pressing the lever shaft 35 in an axial direction may be disposed on the lever shaft 35 so that the backlash between the taper gear 39 and 40 is eliminated.

The steering apparatus of the present invention is applicable not only to the rear-drive four-wheeled vehicle but also to a front-drive or four-wheel drive vehicle.

Although the invention has been described in its preferred form with a certain degree of particularity, obviously many changes and variations are possible therein. It is therefore to be understood that the present invention may be practices otherwise than as specifically described here in without departing from the scope and spirit thereof.

What is claimed is:

1. A steering apparatus for a four-wheeled vehicle, comprising:
- a steering shaft adapted to be rotated by a handle;
- a reduction gear mechanism including: a pinion gear, a steering gear engaged with said pinion gear, a pinion shaft on which said pinion gear is mounted being operatively connected to said steering shaft, a lever shaft on which said steering gear is mounted, said pinion gear and said steering gear cut to a taper respectively;
- a steering lever connected to said lever shaft;
- right and left tic rods operatively connected to said steering lever;
- right and left knuckles operatively connected to said right and left tie rods respectively; and
- a spring that presses one of said gears in an axial direction so that a tapered tooth thickness in teeth of the pinion gear and a tapered tooth thickness in at least one tooth of the steering gear are press-engaged together as taper-off wedges.

2. The steering apparatus for the four-wheeled vehicle according to claim 1, wherein said spring is disposed on one end of said pinion shaft.

3. The steering apparatus for the four-wheeled vehicle according to claim 1, wherein said spring is disposed on one end of said lever shaft.

4. The steering apparatus for the four-wheeled vehicle according to claim 2, wherein said pinion shaft has upper and lower end portions on upper and lower sides which are located on opposite sides with respect to a position at which said pinion gear is mounted on said pinion shaft, said upper end portion being supported by a bearing and said lower end portion being supported by a bearing hole, and wherein said spring is disposed on said bearing hole to press said pinion shaft axially so as to press-engage said pinion gear and said steering gear together.

5. The steering apparatus for the four-wheeled vehicle according to claim 4, wherein said lower end portion is formed more slender than said upper end portion.

* * * * *